United States Patent
Zhao et al.

(10) Patent No.: US 9,052,821 B2
(45) Date of Patent: Jun. 9, 2015

(54) METHOD FOR ADJUSTING SOFT KEYBOARD LAYOUT AND MOBILE TERMINAL

(75) Inventors: Shibao Zhao, Shanghai (CN); Hongchao Leng, Shanghai (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 223 days.

(21) Appl. No.: 13/524,735

(22) Filed: Jun. 15, 2012

(65) Prior Publication Data

US 2012/0256841 A1 Oct. 11, 2012

Related U.S. Application Data

(63) Continuation of application No. PCT/CN2010/078380, filed on Nov. 3, 2010.

(30) Foreign Application Priority Data

Dec. 16, 2009 (CN) .......................... 2009 1 0252779

(51) Int. Cl.
G06F 3/02 (2006.01)
G06F 3/0488 (2013.01)

(52) U.S. Cl.
CPC .......... *G06F 3/04886* (2013.01); *G06F 3/0216* (2013.01)
USPC .............................. 345/168; 345/173; 341/21

(58) Field of Classification Search
CPC ...... G06F 3/0202; G06F 3/021; G06F 3/0213
USPC ................ 345/168–173; 715/773; 341/21–23
See application file for complete search history.

(56) References Cited

U.S. PATENT DOCUMENTS

| | | | |
|---|---|---|---|
| 2002/0149569 A1* | 10/2002 | Dutta et al. | 345/173 |
| 2004/0183834 A1* | 9/2004 | Chermesino | 345/773 |
| 2009/0146957 A1 | 6/2009 | Lee et al. | |
| 2011/0090151 A1 | 4/2011 | Huang et al. | |

FOREIGN PATENT DOCUMENTS

| | | |
|---|---|---|
| CN | 2864805 Y | 1/2007 |
| CN | 101266520 A | 9/2008 |
| CN | 101329616 A | 12/2008 |
| CN | 101419508 A | 4/2009 |

(Continued)

OTHER PUBLICATIONS

Extended European Search Report issued in corresponding European Patent Application No. 10836993.5, mailed Jan. 18, 2013.

(Continued)

*Primary Examiner* — Kimnhung Nguyen
(74) *Attorney, Agent, or Firm* — Brinks Gilson & Lione

(57) ABSTRACT

Embodiments of the present invention disclose a method for adjusting soft keyboard layout. The method includes: displaying an option for adjusting a soft keyboard layout; receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and modifying the soft keyboard layout according to the adjustment scheme. In this way, a requirement of a user for adjusting a keyboard according to personal preference is satisfied.

7 Claims, 5 Drawing Sheets

(56) References Cited

FOREIGN PATENT DOCUMENTS

| | | |
|---|---|---|
| CN | 101710269 A | 5/2010 |
| WO | WO 2011/072556 A1 | 6/2011 |

OTHER PUBLICATIONS

Office Action issued in corresponding Chinese Patent Application No. 200910252779.5, mailed Jul. 2, 2012.

Office Action issued in corresponding CHinese Patent Application No. 200910252779.5, mailed Nov. 9, 2011.

Office Action issued in corresponding Chinese Patent Application No. 200910252779.5, mailed Jan. 26, 2011.

Written Opinion of the International Searching Authority issued in corresponding PCT Patent Applicant No. PCT/CN2010/078380, mailed Feb. 24, 2011.

* cited by examiner

METHOD FOR ADJUSTING SOFT KEYBOARD LAYOUT AND MOBILE TERMINAL

CROSS-REFERENCE TO RELATED APPLICATIONS

This application is a continuation of International Application No. PCT/CN2010/078380, filed on Nov. 3, 2010, which claims priority to Chinese Patent Application No. 200910252779.5, filed on Dec. 16, 2009, both of which are hereby incorporated by reference in their entireties.

FIELD OF THE INVENTION

The present invention relates to the field of mobile terminal technologies, and in particular, to a method for adjusting a soft keyboard layout and a mobile terminal.

BACKGROUND OF THE INVENTION

With development of technologies, a mobile terminal with a touch screen is more and more popular among users for use convenience.

Furthermore, with the maturity of mobile terminal technologies, more and more mobile terminals are not equipped with a conventional input keyboard any longer, and most input is implemented through a soft keyboard that is displayed on the touch screen.

In a process of research and practice of the prior art, the inventor finds that the prior art has the following problem.

Because in the prior art, positions of keys on the soft keyboard are fixed, but many users have some special use requirements, a fixed structure of the soft keyboard of the mobile terminal cannot satisfy the requirements of these users.

SUMMARY OF THE INVENTION

A technical problem that is to be solved in embodiments of the present invention is to provide a method for adjusting a soft keyboard layout and a mobile terminal, which satisfies a requirement of a user for adjusting a keyboard according to personal preference.

To solve the preceding technical problem, an aspect of the embodiments of the present invention provides a method for adjusting a soft keyboard layout, including:
  displaying an option for adjusting a soft keyboard layout;
  receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and
  modifying the soft keyboard layout according to the adjustment scheme.

Another aspect provides a mobile terminal, including:
  a first displaying unit, configured to display an option for adjusting a soft keyboard layout;
  a receiving unit, configured to receive information that a user selects the option for adjusting the soft keyboard layout, where the option for adjusting the soft keyboard layout is displayed by the first displaying unit, and after receiving the information that the user selects the option for adjusting the soft keyboard layout, display a soft keyboard adjustment interface on a touch screen, and receive an adjustment scheme input by the user; and
  an adjusting unit, configured to modify the soft keyboard layout according to the adjustment scheme received by the receiving unit.

Another aspect provides a mobile terminal, including:
  at least one processor and a computer readable storage medium coupled to the at least one processor;
  wherein the at least one processor is configured to:
  display an option for adjusting a soft keyboard layout;
  receive information that a user selects the option for adjusting the soft keyboard layout, and after receiving the information that the user selects the option for adjusting the soft keyboard layout, display a soft keyboard adjustment interface on a touch screen, and receiving an adjustment scheme input by the user; and
  modify the soft keyboard layout according to the adjustment scheme.

Another aspect provides a computer readable storage medium for use in conjunction with a user equipment, the computer readable storage medium comprising a program, if executed, that operate to cause:
  displaying an option for adjusting a soft keyboard layout;
  receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and
  modifying the soft keyboard layout according to the adjustment scheme.

It can be seen from the foregoing technical solutions that, because the option for adjusting the soft keyboard layout may be provided for the user, and the soft keyboard layout is modified according to the adjustment scheme input by the user, the user may customize a soft keyboard layout as required.

DETAILED DESCRIPTION OF THE EMBODIMENTS

Embodiments of the present invention provide a method for adjusting a soft keyboard layout and a mobile terminal, which satisfies a requirement of a user for adjusting a keyboard according to personal preference.

A method for adjusting a soft keyboard layout provided in an embodiment of the present invention includes:

displaying an option for adjusting a soft keyboard layout;

receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and modifying the soft keyboard layout according to the adjustment scheme.

With the method for adjusting the soft keyboard layout provided in this embodiment of the present invention, the option for adjusting the soft keyboard layout may be provided for the user, and the soft keyboard layout is modified according to the adjustment scheme input by the user, so that a requirement of the user for customizing a soft keyboard layout is satisfied.

The displaying a soft keyboard adjustment interface on a touch screen and receiving an adjustment scheme input by the user are implemented in two different modes:

The first mode is a customization mode:

The option for adjusting the soft keyboard layout may be a Customizing Soft Keyboard option. A mobile terminal displays a soft keyboard with a full layout and a soft keyboard with vacant key positions on the touch screen, and a key on the soft keyboard with a full layout is movable; when the user moves the key to the soft keyboard with vacant key positions, a position of the key is recorded as the adjustment scheme.

The second mode is an automatic adjustment mode:

The option for adjusting the soft keyboard layout may be an Auto-Generating option. The mobile terminal displays on the touch screen an interface for automatically generating a soft keyboard layout, and automatic generation is used as the adjustment scheme; then all keys are sorted according to recorded use times or use frequencies of keys, and the soft keyboard layout is modified according to a sorting result.

Furthermore, the mobile terminal may simultaneously provide two different modes for the user to select. At this time, the touch screen may display two different options simultaneously: a Customizing Soft Keyboard option and an Auto-Generating option, and different adjustment modes are provided according to different selections of the user; and the touch screen may also provide a multi-level menu, where a first-level option for adjusting the soft keyboard layout is displayed first, and then the Customizing Soft Keyboard option and the Auto-Generating option are displayed after the user selects the first-level option for adjusting the soft keyboard layout.

Figure 1:
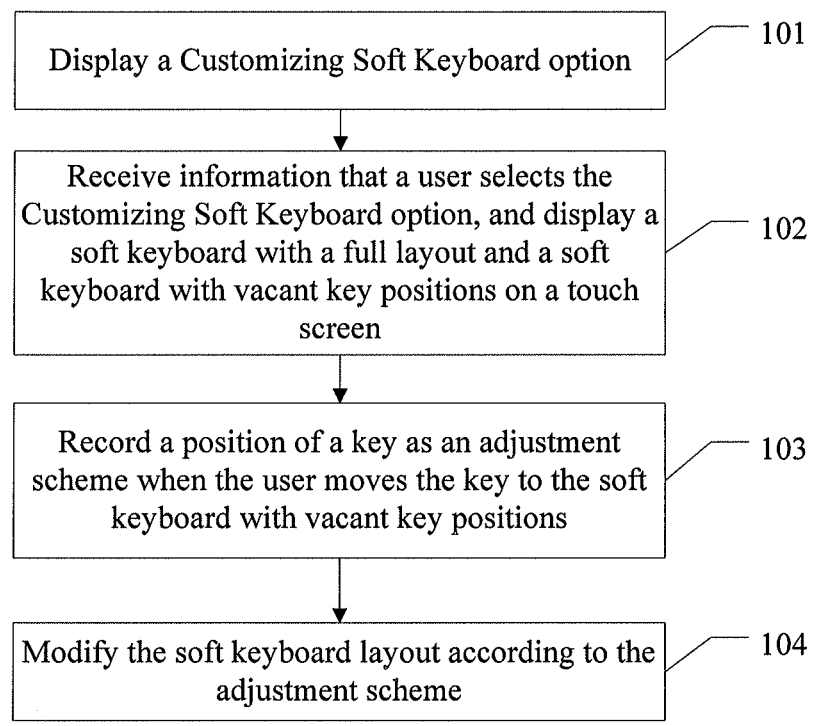
FIG. 1 is a flowchart of a method for adjusting a soft keyboard layout according to a first embodiment of the present invention.

Taking as an example that the customization mode is used, FIG. 1 is a flowchart of a method for adjusting a soft keyboard layout according to a first embodiment of the present invention, and the method includes:

101. Display a Customizing Soft Keyboard option.

A mobile terminal displays a selectable option for adjusting the soft keyboard layout on a touch screen, where the name of the option may be "Customizing Soft Keyboard Layout" or "Soft Keyboard Layout Customization".

102. Receive information that a user selects the Customizing Soft Keyboard option, and display a soft keyboard with a full layout and a soft keyboard with vacant key positions on the touch screen.

Figure 2:
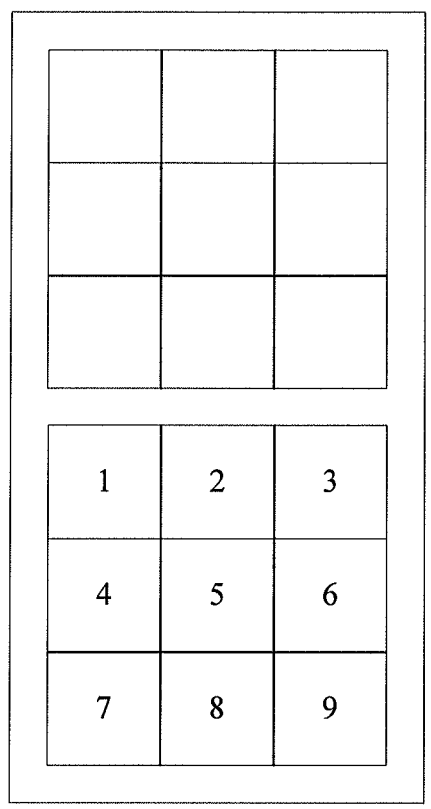
FIG. 2 is a schematic layout diagram of displaying a soft keyboard with a full layout and a soft keyboard with vacant key positions according to an embodiment of the present invention.

FIG. 2 is a schematic layout diagram of displaying a soft keyboard with a full layout and a soft keyboard with vacant key positions according to an embodiment of the present invention. The soft keyboard with a full layout has 9 keys, which respectively are 1, 2, 3, 4, 5, 6, 7, 8, and 9; and the soft keyboard with vacant key positions has 9 vacant positions, which is only an example. In practical use, a keyboard may have many layouts, which are not enumerated here. Keys on the soft keyboard with a full layout are movable.

103. Record a position of a key as an adjustment scheme when the user moves the key to the soft keyboard with vacant key positions.

The user may click or drag the key on the soft keyboard with a full layout to the keyboard with vacant key positions, place the key to a target position where the user wants to set, complete a new layout of the whole soft keyboard, click and confirm the setting after completing the setting, and record the position of the key as the adjustment scheme.

Figure 3:
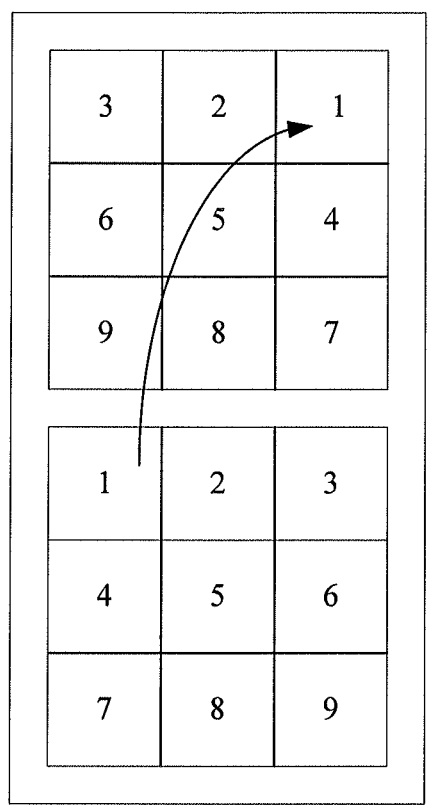
FIG. 3 is a schematic diagram of a process of adjusting a soft keyboard layout according to an embodiment of the present invention.

FIG. 3 is a schematic diagram of a process of adjusting a soft keyboard layout according to an embodiment of the present invention. On an original soft keyboard with vacant key positions, a user completes a new keyboard layout, and 9 keys are respectively "3, 2, 1", "6, 5, 4", and "9, 8, 7".

104. Modify the soft keyboard layout according to the adjustment scheme.

Figure 4:
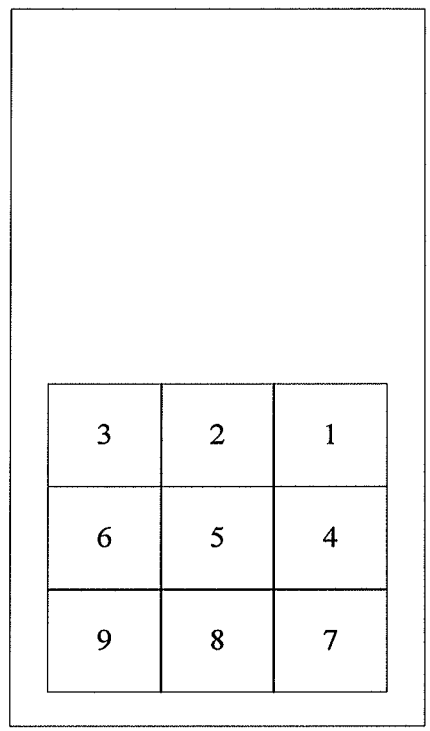
FIG. 4 is a schematic diagram of completion of adjusting a soft keyboard layout according to an embodiment of the present invention.

After completing the new keyboard layout, the user clicks and confirms the new keyboard layout. The mobile terminal modifies the soft keyboard layout according to the key position adjusted by the user. FIG. 4 is a schematic diagram of completion of adjusting a soft keyboard layout according to an embodiment of the present invention.

After the user clicks and confirms the new keyboard layout, a soft keyboard interface provided by the mobile terminal becomes an interface as shown in FIG. 4. At this time, key value information stored by each key position is also updated synchronously, for example, an original position 1 in FIG. 1 is reported as an event 1 to an application layer when the user clicks the position, but when the user sets an input interface as that shown in FIG. 3, the user clicks the same position, that is, a position 3 in FIG. 3, what is reported to the application layer is an event 3. In this way, resetting of the whole input interface is completed.

Figure 5:
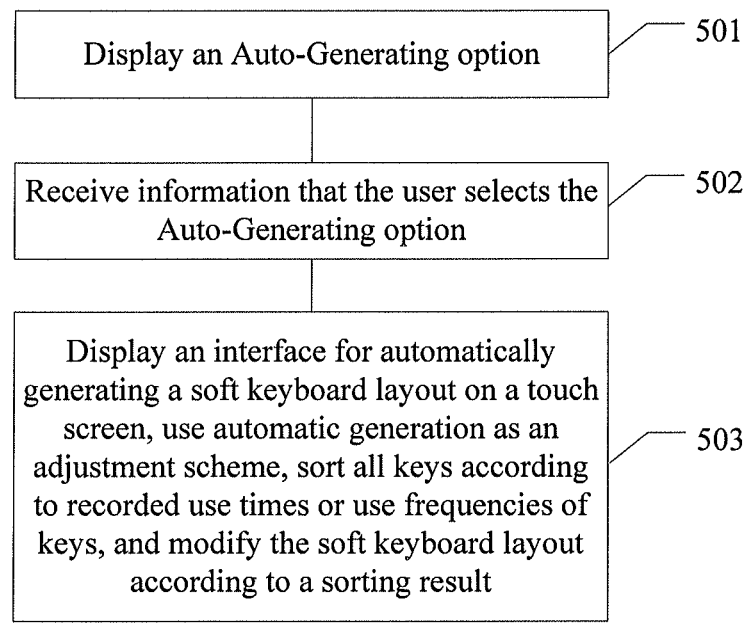
FIG. 5 is a flowchart of a method for adjusting a soft keyboard layout according to a second embodiment of the present invention.

Taking as an example that the second mode is used, FIG. 5 is a flowchart of a method for adjusting a soft keyboard layout according to a second embodiment of the present invention, and the method includes:

501. Display an Auto-Generating option.

A mobile terminal displays a selectable Auto-Generating option on a touch screen, where the name of the option may be "Auto-Adjusting Soft Keyboard Layout" or "Soft Keyboard Layout Auto-Adjustment".

502. Receive information that the user selects the Auto-Generating option.

503. Display an interface for automatically generating a soft keyboard layout on the touch screen, use automatic generation as an adjustment scheme, sort all keys according to recorded use times or use frequencies of keys, and modify the soft keyboard layout according to a sorting result.

The mobile terminal presets a counter for each key, and use times of each key are recorded, or use frequencies of each key are recorded.

After receiving the information that the user selects the Auto-Generating option, the mobile terminal displays the interface for automatically generating the soft keyboard layout, prompting the user that the soft keyboard layout is being generated automatically. A picture or text used in the prompt may be set as required, for example, a progress bar or a text prompt.

At the same time when displaying the interface for automatically generating the soft keyboard layout, the mobile terminal sorts all keys from high to low according to the recorded use times or use frequencies of keys.

Still taking the keyboard layout in FIG. 2 as an example, it is assumed that when the mobile terminal receives the information that the user selects the Auto-Generating option, use times of each key are:

8 times for key "1"
7 times for key "2"
10 times for key "3"
11 times for key "4"
3 times for key "5"
2 times for key "6"
1 time for key "7"
15 times for key "8"
0 time for key "9".

Figure 6:
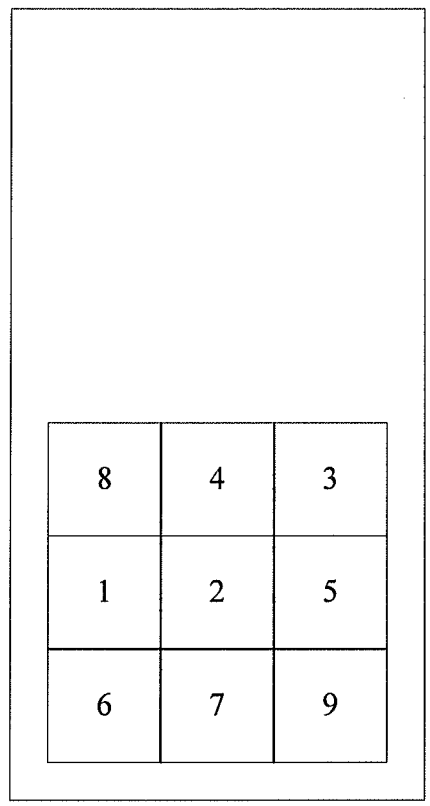
FIG. 6 is a schematic diagram of completion of adjusting a soft keyboard layout according to another embodiment of the present invention.

A new sorting sequence of the soft keyboard is shown in FIG. 6 and is: "8, 4, 3", "1, 2, 5", and "6, 7, 9". If the user presses 8 after completion of sorting, the input is 8, but a position 8 is 1 previously. In this way, a new keyboard layout is completed according to an input frequency.

Persons of ordinary skill in the art may understand that all or a part of the steps in the method in the preceding embodiments of the present invention may be completed by a program instructing relevant hardware. The program may be stored in a computer readable storage medium. When the program runs, the following steps are executed:

A method for adjusting a soft keyboard layout includes:
displaying an option for adjusting a soft keyboard layout;
receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and
modifying the soft keyboard layout according to the adjustment scheme.

The storage medium mentioned in the preceding may be a Read Only Memory, a magnetic disk, or a compact disk.

Figure 7:
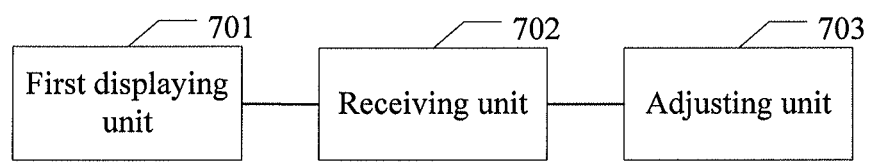
FIG. 7 is a schematic structural diagram of a mobile terminal according to an embodiment of the present invention.

FIG. 7 shows a structure of a mobile terminal provided in an embodiment of the present invention, and the mobile terminal includes:

a first displaying unit 701, configured to display an option for adjusting a soft keyboard layout;

a receiving unit 702, configured to receive information that a user selects the option for adjusting the soft keyboard layout, where the option for adjusting the soft keyboard layout is displayed by the first displaying unit 701, and after receiving the information that the user selects the option for adjusting the soft keyboard layout, display a soft keyboard adjustment interface on a touch screen, and receive an adjustment scheme input by the user; and an adjusting unit 703, configured to modify the soft keyboard layout according to the adjustment scheme received by the receiving unit 702.

When the option for adjusting the soft keyboard layout is a Customizing Soft Keyboard option, the receiving unit 702 includes:

a second displaying unit, configured to receive the information that the user selects the option for adjusting the soft keyboard layout, where the option for adjusting the soft keyboard layout is displayed by the first displaying unit, and after receiving the information that the user selects the option for adjusting the soft keyboard layout, display a soft keyboard with a full layout and a soft keyboard with vacant key positions on the touch screen, where a key on the soft keyboard with a full layout is movable; and a recording unit, configured to record a position of a key as the adjustment scheme when the user moves the key to the soft keyboard with vacant key positions, where the soft keyboard with vacant key positions is displayed by the second displaying unit.

When the option for adjusting the soft keyboard layout is an Auto-Generating option, the receiving unit 702 includes:

a third displaying unit, configured to, after receiving the information that the user selects the option for adjusting the soft keyboard layout, display an interface for automatically generating a soft keyboard layout on the touch screen, and use automatic generation as the adjustment scheme.

The adjusting unit 703 includes:

a first adjusting unit, configured to sort all keys according to recorded use times or use frequencies of keys, and modify the soft keyboard layout according to a sorting result.

When a multi-level menu is used to display the option for adjusting the soft keyboard layout, the first displaying unit 701 includes:

a first-level displaying unit, configured to display a first-level option for adjusting the soft keyboard layout on the touch screen; and a second-level displaying unit, configured to display a Customizing Soft Keyboard option and an Auto-Generating option on the touch screen simultaneously after receiving information that the user selects the first-level option for adjusting the soft keyboard layout, where the first-level option for adjusting the soft keyboard layout is displayed by the first-level displaying unit.

A specific using method of the mobile terminal provided in this embodiment of the present invention may be made reference to the description of the method for adjusting the soft keyboard layout provided in the preceding embodiments of the present invention, and is not further described here.

The method for adjusting soft keyboard layout and the mobile terminal which are provided in the present invention are described in detail in the preceding. Although a principle and implementation of the present invention are described with reference to the embodiments, the embodiments are only used to help understand the method and core idea of the present invention. Meanwhile, according to the idea of the present invention, a modifications and variations may be made by persons of ordinary skill in the art to the implementation and application scope of the present invention. In conclusion, the content of this specification shall not be construed as a limitation on the present invention.

What is claimed is:

1. A method for adjusting a soft keyboard layout, comprising:
displaying an option for adjusting a soft keyboard layout;
receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and
modifying the soft keyboard layout according to the adjustment scheme;
wherein the option for adjusting the soft keyboard layout is a Customizing Soft Keyboard option; the displaying a soft keyboard adjustment interface on a touch screen, and receiving an adjusting scheme input by the user comprise:
displaying a soft keyboard with a full layout and a soft keyboard with vacant key positions on the touch screen, wherein a key on the soft keyboard with a full layout is movable; and recording a position of a key as the adjustment scheme when the user moves the key to the soft keyboard with vacant key positions.

2. The method according to claim 1, wherein the option for adjusting the soft keyboard layout comprises the Customizing Soft Keyboard option and an Auto-Generating option, and the displaying the option for adjusting the soft keyboard layout comprises:
  displaying a first-level option for adjusting the soft keyboard layout on the touch screen; and
  after receiving information that the user selects the first-level option for adjusting the soft keyboard layout, displaying the Customizing Soft Keyboard option and the Auto-Generating option simultaneously.

3. A mobile terminal, comprising:
  a first displaying unit, configured to display an option for adjusting a soft keyboard layout;
  a receiving unit, configured to receive information that a user selects the option for adjusting the soft keyboard layout, wherein the option for adjusting the soft keyboard layout is displayed by the first displaying unit, and after receiving the information that the user selects the option for adjusting the soft keyboard layout, display a soft keyboard adjustment interface on a touch screen, and receive an adjustment scheme input by the user; and
  an adjusting unit, configured to modify the soft keyboard layout according to the adjustment scheme received by the receiving unit;
  wherein the option for adjusting the soft keyboard layout is a Customizing Soft Keyboard option; the receiving unit comprises:
  a second displaying unit, configured to receive the information that the user selects the option for adjusting the soft keyboard layout, wherein the option for adjusting the soft keyboard layout is displayed by the first displaying unit, and after receiving the information that the user selects the option for adjusting the soft keyboard layout, display a soft keyboard with a full layout and a soft keyboard with vacant key positions on the touch screen, wherein a key on the soft keyboard with a full layout is movable; and
  a recording unit, configured to record a position of a key as the adjustment scheme when the user moves the key to the soft keyboard with vacant key positions, wherein the soft keyboard with vacant key positions is displayed by the second displaying unit.

4. The mobile terminal according to claim 3, wherein the option for adjusting the soft keyboard layout comprises the Customizing Soft Keyboard option and an Auto-Generating option, and the first displaying unit comprises:
  a first-level displaying unit, configured to display a first-level option for adjusting the soft keyboard layout on the touch screen; and
  a second-level displaying unit, configured to display the Customizing Soft Keyboard option and the Auto-Generating option on the touch screen simultaneously after receiving information that the user selects the first-level option for adjusting the soft keyboard layout, wherein the first-level option for adjusting the soft keyboard layout is displayed by the first-level displaying unit.

5. A mobile terminal, comprising:
  at least one processor and a computer readable storage medium coupled to the at least one processor;
  wherein the at least one processor is configured to:
  display an option for adjusting a soft keyboard layout;
  receive information that a user selects the option for adjusting the soft keyboard layout, and after receiving the information that the user selects the option for adjusting the soft keyboard layout, display a soft keyboard adjustment interface on a touch screen, and receiving an adjustment scheme input by the user; and
  modify the soft keyboard layout according to the adjustment scheme;
  wherein the option for adjusting the soft keyboard layout is a Customizing Soft Keyboard option; the at least one processor is configured to:
  display a soft keyboard with a full layout and a soft keyboard with vacant key positions on the touch screen, wherein a key on the soft keyboard with a full layout is movable; and
  record a position of a key as the adjustment scheme when the user moves the key to the soft keyboard with vacant key positions.

6. The mobile terminal according to claim 5, wherein the option for adjusting the soft keyboard layout comprises the Customizing Soft Keyboard option and an Auto-Generating option, and the at least one processor is configured to:
  display a first-level option for adjusting the soft keyboard layout on the touch screen; and
  display the Customizing Soft Keyboard option and the Auto-Generating option on the touch screen simultaneously after receiving information that the user selects the first-level option for adjusting the soft keyboard layout.

7. A non-transitory computer readable storage medium for use in conjunction with a user equipment, the non-transitory computer readable storage medium comprising a program, if executed, that operate to cause:
  displaying an option for adjusting a soft keyboard layout;
  receiving information that a user selects the option for adjusting the soft keyboard layout, and after receiving the information that the user selects the option for adjusting the soft keyboard layout, displaying a soft keyboard adjustment interface on a touch screen, and receiving an adjustment scheme input by the user; and
  modifying the soft keyboard layout according to the adjustment scheme;
  wherein the option for adjusting the soft keyboard layout is a Customizing Soft Keyboard option; the displaying a soft keyboard adjustment interface on a touch screen, and receiving an adjusting scheme input by the user comprise:
  displaying a soft keyboard with a full layout and a soft keyboard with vacant key positions on the touch screen, wherein a key on the soft keyboard with a full layout is movable; and
  recording a position of a key as the adjustment scheme when the user moves the key to the soft keyboard with vacant key positions.

* * * * *